United States Patent
Mangin et al.

(10) Patent No.: US 7,860,108 B2
(45) Date of Patent: Dec. 28, 2010

(54) METHODS AND DEVICES FOR TRANSFERRING AND FOR RECOVERING DATA PACKETS

(75) Inventors: Christophe Mangin, L'Hermitage (FR); Romain Rollet, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1648 days.

(21) Appl. No.: 10/968,013

(22) Filed: Oct. 20, 2004

(65) Prior Publication Data

US 2005/0122994 A1 Jun. 9, 2005

(30) Foreign Application Priority Data

Oct. 22, 2003 (EP) .................................. 03292640

(51) Int. Cl.
*H04L 12/28* (2006.01)

(52) U.S. Cl. ..................... 370/395.5; 370/464; 370/474; 370/469

(58) Field of Classification Search ............ 370/395.64, 370/474, 469, 464, 395.5
See application file for complete search history.

(56) References Cited

U.S. PATENT DOCUMENTS

| | | | | |
|---|---|---|---|---|
| 5,414,702 A | * | 5/1995 | Kudoh | 370/395.7 |
| 5,570,362 A | * | 10/1996 | Nishimura | 370/466 |
| 5,781,567 A | * | 7/1998 | Sako et al. | 714/762 |
| 5,822,321 A | * | 10/1998 | Petersen et al. | 370/474 |
| 5,917,828 A | * | 6/1999 | Thompson | 370/474 |
| 6,061,820 A | * | 5/2000 | Nakakita et al. | 714/751 |
| 6,108,336 A | * | 8/2000 | Duault et al. | 370/395.6 |
| 6,418,145 B1 | * | 7/2002 | Isoyama et al. | 370/395.65 |
| 6,574,226 B1 | * | 6/2003 | Nakano et al. | 370/395.64 |
| 6,681,364 B1 | * | 1/2004 | Calvignac et al. | 714/776 |
| 6,876,671 B1 | * | 4/2005 | Rambaud et al. | 370/474 |
| 7,224,703 B2 | * | 5/2007 | Antal et al. | 370/473 |
| 7,359,403 B1 | * | 4/2008 | Rinne | 370/469 |
| 2001/0027489 A1 | * | 10/2001 | Miyamoto et al. | 709/238 |
| 2001/0033582 A1 | * | 10/2001 | Sarkkinen et al. | 370/474 |
| 2003/0012192 A1 | * | 1/2003 | Dore et al. | 370/389 |
| 2003/0110286 A1 | | 6/2003 | Antal et al. | |
| 2004/0194000 A1 | * | 9/2004 | Lin et al. | 714/776 |
| 2005/0135291 A1 | * | 6/2005 | Ketchum et al. | 370/319 |

FOREIGN PATENT DOCUMENTS

| | | |
|---|---|---|
| EP | 0 745 295 | 12/1996 |
| WO | WO 96/19882 | 6/1996 |

* cited by examiner

*Primary Examiner*—Ricky Ngo
*Assistant Examiner*—DeWanda Samuel
(74) *Attorney, Agent, or Firm*—Oblon, Spivak, McClelland, Maier & Neustadt, L.L.P.

(57) ABSTRACT

There is disclosed a method of transferring input data packets from an upper layer to a lower layer of a stack of communication protocol layers, wherein the lower layer supports variable sized packets. One input data packet is received from the upper layer. This input data packet is segmented into several data segments the size of which is selected in a list of a given number N of predetermined segment size values. Signalling information is added to each data segment to form output data packets, which is delivered to a lower layer. Selection of the segment size value is performed according to an algorithm which minimizes the overall ineffective data and/or the overall signalling information. Thus, the transmission overhead generated by the segmentation scheme is reduced.

13 Claims, 4 Drawing Sheets

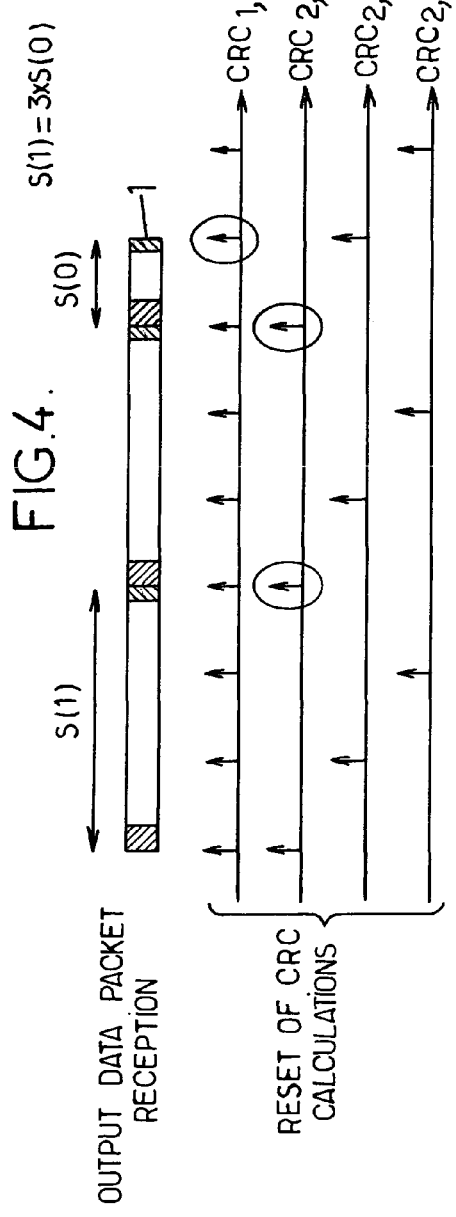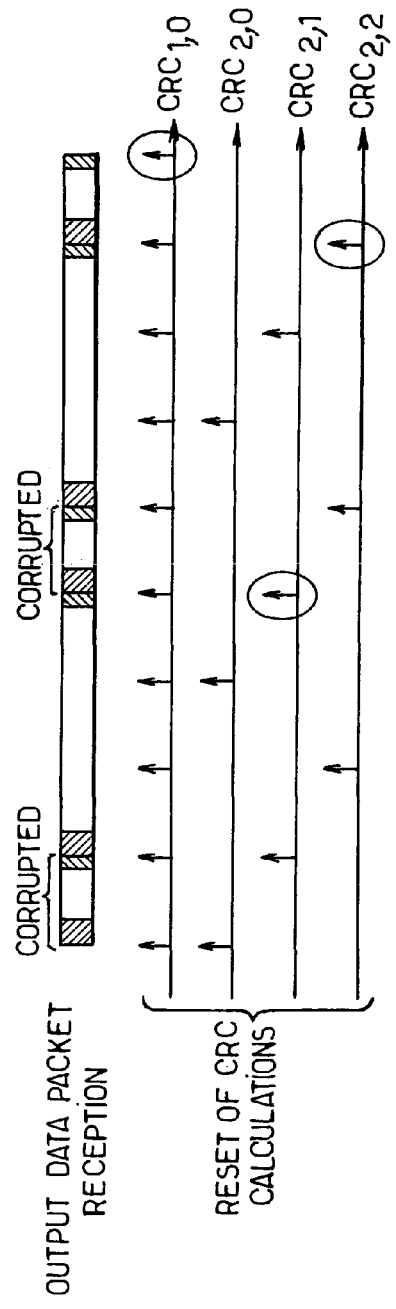

METHODS AND DEVICES FOR TRANSFERRING AND FOR RECOVERING DATA PACKETS

BACKGROUND OF THE INVENTION

1. Technical Field

The present invention relates generally to communication system and in particular, to a method of transferring input data packets from an upper layer to a lower layer of a stack of communication protocol layers, the lower layer supporting variable sized packets. The invention also relates to a method of recovering input data packets received from a lower layer in a flow of output data packets.

2. Related Art

Communication systems require both reliable and efficient transmission methods. Generally, the transmission reliability is increased by sending shorter data packets. Actually, data corruption due to transmission errors occurs statistically more often during the transmission of a long packet than during the transmission of a relatively shorter packet. In addition, when data corruption occurs, it is generally easier to detect transmission errors in a shorter packet than in a longer packet. Moreover, it is quicker to retransmit a shorter packet than a longer packet.

Stated otherwise, the transmission of shorter data packets, compared with longer data packets, allows reducing packet error rate, increasing retransmission efficiency and decreasing retransmission delay.

In this context, a segmentation scheme for transforming data packets of a given size into several shorter data segments for data transmission purpose is desirable.

However, a segmentation scheme induces a substantial transmission overhead, which decreases the transmission efficiency. The transmission overhead introduced by segmentation scheme depends on the size of data segments and may comprise two types of overhead, as it is explained below.

Firstly, a signaling overhead corresponds to signaling information added to each data segment during the segmentation scheme, whose function is to allow reassembly of the data segments at the receiver. This signaling overhead is proportional to the number of data segments. As a consequence, it is higher with shorter data segments than with longer data segments.

Secondly, a segment overhead results from transmission of ineffective data, which may be introduced during the segmentation scheme to reach a predetermined segment size value. This segment overhead is higher with longer data segments than with shorter data segments.

Different methods have been disclosed to optimise the segmentation scheme depending on characteristics of medium (reliability, bandwith . . . ) and on requirements of a given application (transfer of voice data, transfer of video data . . . ).

Methods of a first type use segmentation into a fixed size data segment. In general, the fixed size is made dependent on characteristics of the physical layer to provide a compromise between a long size value and a relatively shorter size value. The long size value allows a decrease of signaling overhead. The relatively shorter size value is preferred in order to reduce the segment overhead, to reduce packet error rate, to increase retransmission efficiency and thereby to achieve low transmission delay. Regarding unreliable physical links wherein packet error rate is high, relatively shorter size values are generally preferred, even if the signaling overhead is increased.

Methods of a second type rely on a variable segment size value. As all data segments have different sizes, such methods are based on the assumption that the physical layer is able to synchronize on the beginning of each of the data segments. Generally, the synchronization which is required is difficult to achieve and induces a large overhead at the physical layer.

SUMMARY OF THE INVENTION

An object of the invention is to combine the respective advantages of transmission methods of each of the first and second types referred to herein above.

According to a first aspect, the invention thus proposes a method of transferring input data packets from an upper layer of a stack of communication protocol layers to a lower layer supporting variable sized packets, the method comprising the steps of:

receiving one input data packet from the upper layer;

segmenting the input data packet into several effective data parts to form respective data segments;

wherein the size of each one of the data segments is selected in a list comprising a given number N of predetermined segment size values;

wherein the data segment includes one of the effective data parts and possibly an ineffective data part to reach the selected segment size value; and, wherein the selection of one of the segment size values in the list is performed according to a selection algorithm which minimizes overall ineffective data and/or overall signaling information;

adding signaling information associated to each of the data segments so as to generate respective output data packets; and, delivering the output data packets to the lower layer.

A second aspect of the present invention relates to a method of recovering input data packets received from a lower layer in a flow of output data packets generated according to the method of the first aspect. The method comprises the steps of:

detecting and retrieving the size of the output data packets wherein all the values in the list of predetermined segment size values are considered;

retrieving data segments from respective retrieved output data packets; and, reassembling the retrieved data segments to form input data packets to be provided to the upper layer.

A third aspect of the invention is directed at a device for transferring input data packets from an upper layer of a stack of communication protocol layers to a lower layer supporting variable sized packets. The device comprises:

means for receiving one input data packet from the upper layer;

means for segmenting the input data packet into several effective data parts to form respective data segments;

wherein the size of each one of the data segments is selected in a list comprising a given number N of predetermined segment size values;

wherein the data segment comprises one of the effective data parts and possibly an ineffective data part to reach the the selected segment size value; and, wherein the selection of one of the segment size values in the list is performed according to an algorithm minimizing overall ineffective data and/or overall signaling information;

means for adding signaling information and associated to each of the data segments so as to generate respective output data packets; and, means for delivering the output data packets to the lower layer.

A fourth aspect of the invention relates to a device for recovering input data packets received from a lower layer in a flow output data packets generated by a device according to the third aspect. The device comprises:

means for detecting and retrieving the size of the output data packets, having means for considering all the values in the list of predetermined segment size values are;

means for retrieving data segments from respective retrieved output data packets; and, means for reassembling the retrieved data segments to form input data packets to be provided to the upper layer.

The present invention increases transmission efficiency by reducing segment overhead and signaling overhead without increasing overhead at the physical layer. Further, it is adaptable to any type of physical layer.

The method of transferring proposes simple rules of segmentation.

The method of recovering input data packets allows to retrieve easily the input data packets in the flow of output data.

In a preferred embodiment, the list of predetermined segment size values comprises two different segment size values. This embodiment can be applied easily with a clear benefit on the transmission overhead aspect. It is particularly adapted to a wireless environment, which yields in the physical layer being unreliable.

BRIEF DESCRIPTION OF THE DRAWINGS

Further features and advantages of the present invention will become more apparent from the description below. This is given purely by way of illustration and should be read in conjunction with the appended drawings, of which:

FIGS. 4 and 5 are time diagrams illustrating an exemplary method of recovering input data packets in a flow of output data packets based on periodic concurrent cyclic redundancy codes (CRCs) calculations, respectively in case of an uncorrupted transmission and in case of a corrupted transmission;

DESCRIPTION OF PREFERRED EMBODIMENTS

The present invention is described herein below in one exemplary application to the Medium Access Control (MAC) layer, which is part of the OSI ("Open System Interconnect") model of ISO ("International Standardization Organization"). Of course, the scope of the invention encompasses applications to any stack of communication protocol layers.

Aspects of the invention from the transmitter side and from the receiver side will be described successively.

In the following description, data lengths, indexes and packet sizes are expressed in number of data words. The data word definition may change according to the implementation. The most common implementations use one byte (8 bits) as a data word.

Figure 1:
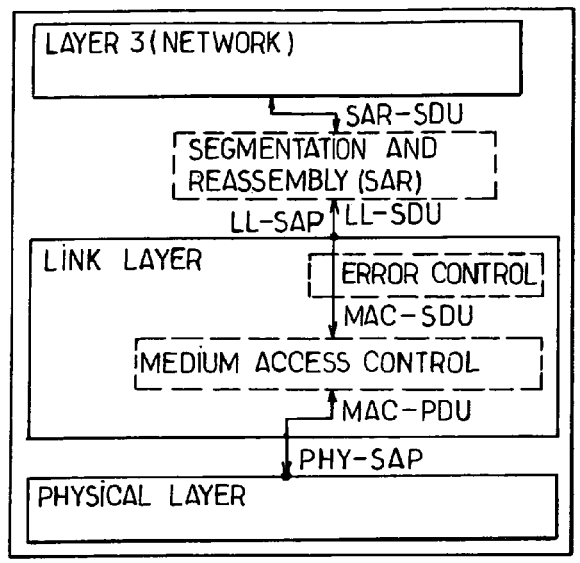
FIG. 1 is a view of an exemplary stack of protocol layers to which the method of transferring of the present invention is applied.

FIG. 1 shows a part of a stack of communication protocol layers according to OSI standard. The Link Layer (LL) is responsible for sharing service provided by a physical interface between many users. The LL contains usually a Medium Access Control (MAC) and an Error Control (EC) sub-layers. The EC sub-layer performs error correction and flow control. The MAC sub-layer organises access to the physical layer and exchanges data with the physical layer by using basic data unit called output data packets.

Figure 2:
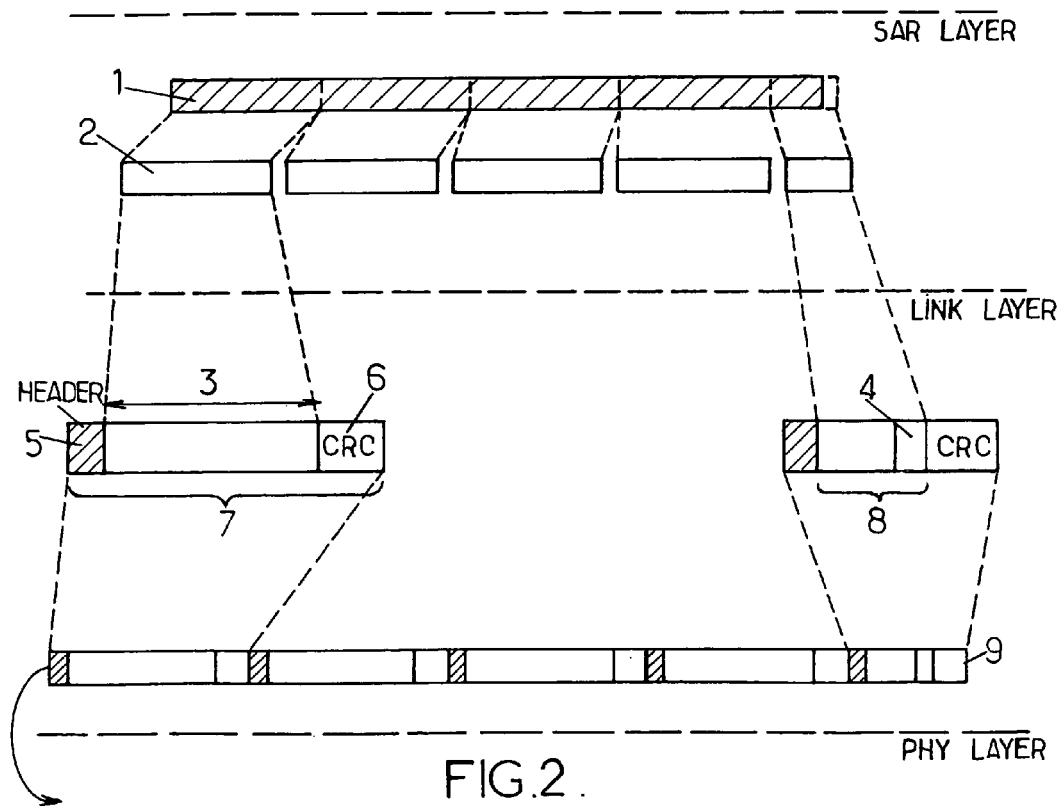
FIG. 2 is a flowchart illustrating an exemplary way of ??? out the transferring aspect of the invention.

FIG. 2 illustrates the transferring of data from a so-called upper layer to a so-called lower layer of a stack of protocol layers in a transmitter. Steps of this method are distributed over two distinct layers: namely a SAR layer and the Link Layer.

The SAR layer, which lay below the upper layer, is in charge of the segmentation scheme. One input data packet 1 received by the SAR layer is segmented in several effective data parts 2, the size of these effective data parts being chosen according to rules which are given below. These effective data parts are delivered to the Link Layer.

The Link Layer is in charge of forming data segments each having a respective size, the value s(i) of which is selected in a list as will be discussed below. If needed, an ineffective data part 4 is added to reach data segment size value s(i).

The segmentation scheme is based on a list comprising a given number N of predetermined segment size values, respectively denoted $s(0), \ldots, s(i), \ldots, s(N-1)$, at least some of which are less than the length of the input data packets. In one embodiment, which is considered here, the list of segment size values is sorted by increasing order. Stated otherwise, $s(0)<s(1)<\ldots<s(i)<\ldots<s(N-1)$.

In order to reduce the segment overhead, there is applied a selection algorithm which may comprise the following rules in order to select the more suitable segment size value used to form a data segment comprising an effective data part cut out of the input data packet:

a) when forming data segment, from the first one until the last but one data segment, the greatest segment size value in the list is selected which is shorter than the length of the input data packet, b) when forming the last data segment, that segment size value is selected which contains the whole last effective part and which minimizes the length of the ineffective data part in the last data segment.

Such a selection algorithm is adapted for reducing the overhead, that is the overall ineffective data and/or overall signaling information in the output stream of data packets.

Of course, other selection algorithms may be preferred, for instance a selection algorithm according to which the greatest segment size value which minimizes the ineffective data part in the data segment is selected.

When the input data packet is fully segmented, the SAR layer delivers the resulting effective data parts 2 to the Link Layer.

The Link layer is able to manage different size of data segments 3.

The list of predetermined segment size values is provided in the configuration parameters to SAR layer and Link Layer The Link Layer Service Access Point (LL SAP) is modified so that the size of a given data segment is exchanged between the SAR layer and the Link layer.

The Link Layer is also in charge of forming output data packets. To this end, a signalling part, which is distributed in a header field 5 and in a trailer field 6, is added to each data segment, so as to generate output data packets 7.

In one embodiment, the trailer field 5 comprises a cyclic redundancy code (CRC) as signaling information. The CRC calculation is performed on at least some, and preferably all the bits of the header field 5 and on the data segment 3. It should be understood, however, that the invention is not intended to be limited neither by specific position nor by the nature of signaling information.

The Link Layer delivers output data packets 7, whereby forming the flow 9 of packets which is provided to the lower layer, which is the physical layer in the example described here. The delivery may be performed in any order of output data packets.

In one preferred embodiment, the list of N predetermined segment size values is such that after adding the signalling information distributed in a header 5 and a trailer 6, the output data packet, size values are respective multiple of the smallest one of them.

Stated otherwise, where $S(0), S(1), \ldots, S(N-1)$ denote the respective sizes of output data packets managed by the link layer (arranged by ascending order), the above rule reads:

$$S(i)=n(i)\times S(0),$$

where n(i) is a given integer strictly positive, and
where i is an index ranging from 0 to N-1.

The size of the header field H and the size of the trailer field T are preferably constant. As a consequence, the segment sizes are not multiples one of each other.

Of course, it shall be noted that the invention is not in any way intended to be limited to these specific characteristics.

Considering the exemplary embodiment described above, the list of N predetermined segment size values is built according to the following rule:

choosing the smallest output data packet size value $S(0)$,
choosing N-1 multiples of $S(0)$, namely $n(1)\times S(0)$, $n(i)\times S(i), \ldots, n(N-1)\times S(0)$, where n(i) is a given integer strictly positive, to build the list of output data packet size values $S(0), S(1), \ldots, S(i) \ldots, S(N-1)$,
defining the list of predetermined segment size values, $s(0), s(1), \ldots, s(N-1)$ whereby $s(i)=S(i)-H-T$ with i ranging from 0 to N-1.

On the receiver side, the physical layer transfers to the Link Layer a flow 9 of output data packets of different sizes.

The assumption is made that the physical layer indicates to the Link Layer the reception of the first output data packet. The Link Layer is in charge of detecting the respective size of the output data packets and to provide the upper layer SAR with the corresponding effective data parts.

The respective sizes of the output data packets received in the flow 9 are comprised in the aforementioned list of N output data packet size values, $S(0), S(1), \ldots, S(N-1)$. The Link Layer considers all these size values in order to retrieve all output data packets from the flow 9 whatever their size.

Figure 3:
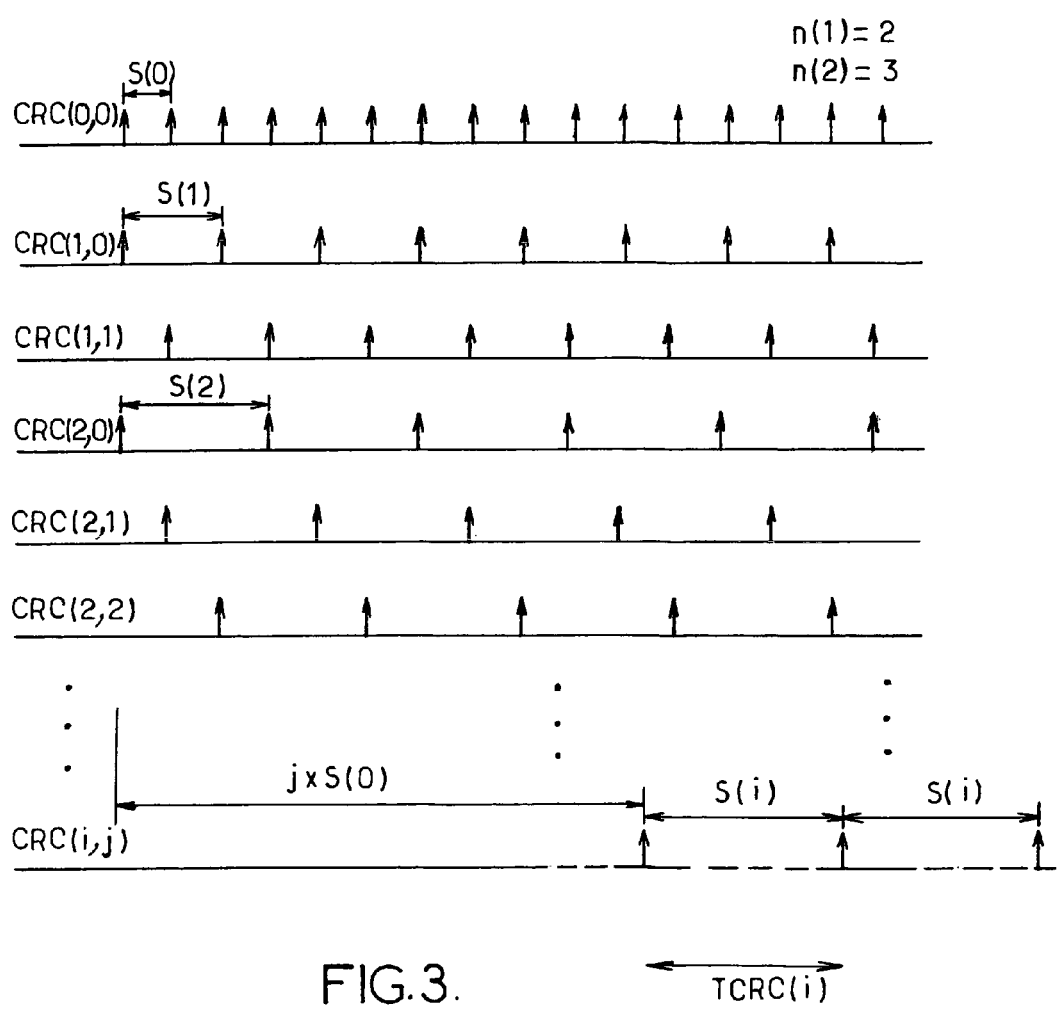
FIG. 3 shows periodic concurrent CRC calculations performed at the receiver according to the method of recovering output data packets of the invention.

The method of retrieving output data packets which is disclosed here is based on periodic and concurrent CRCs calculations as it is illustrated in FIG. 3. FIGS. 4 and 5, which illustrate one way of carrying out this method with N=2, will be described below. A general case will now be explained. Notations used to address the general case are introduced in the FIG. 3.

In FIG. 3, the small vertical arrows designate the instants at which a CRC calculation is performed.

CRC calculations are started at the beginning of the flow reception, that is as soon as the physical layer detects the flow reception.

A CRC calculation is to be performed on a number S(i) of bytes in order to allow detection of an output data packet of size S(i). As a consequence, N types of CRC calculations are performed by current manner: one for each of the possible S(i) size values. The type of CRC calculation corresponding to the detection of a given S(i) size value is denoted CRC(i) in what follows.

More specifically, N series of periodic CRC calculations, one of each type CRC(i) with i ranging from 0 to N-1, are started in concurrency as soon as the beginning of flow 9 is detected, these series of concurrent CRC(i) calculations are started simultaneously and performed periodically, with a respective period TCRC(i) of S(i) bytes, for i=0 to N-1 as shown in the FIG. 3.

Besides, considering that all possible size values of the output data packets are multiple of the smallest size value S(0), a series of calculation of types CRC(i) is started every S(0) bytes to allow detection of all output data packets of any size S(i) possibly present anywhere in the flow 9.

Stated otherwise, for each possible size value S(i), a series of CRC calculation of type CRC(i) is started at instants respectively shifted of a number $j\times S(0)$ of bytes, for j=0 to n(i)-1, in order to go through the whole size value of S(i) with a granularity of S(0).

A given CRC calculation of type CRC(i), which is started at instants spaced by time intervals corresponding to $j\times S(0)$ bytes, is noted CRC(i,j) for i=0 to N-1 and for j=0 to n(i)-1.

The size S(i) and the position of an output data packet in the flow 9 is deduced from the indexes i and j associated to the CRC calculation which is successful. Namely, if the CRC calculation of the CRC(i,j) succeeds at an instant corresponding to a number X of bytes from the beginning of the data flow, it means that the size of the output data packet is S(i), and that the first bit of the output data packet is that one which was received at the instant corresponding to X-S(i) bytes from the beginning of the data flow.

For the sake of better understanding, FIGS. 4 and 5 illustrate one exemplary way of carrying out the detection of output data packet sizes by CRC calculations as mentioned above. In the FIGS. 4 and 5, the small vertical arrows designate the instants at which a CRC calculation is performed and the rings around arrows show successful CRC calculations.

In the example described, the list comprises only two output data packet sizes S(0) and S(1) which have to be detected, wherein $S(1)=3\times S(0)$. Stated otherwise, N is equal to 2 and n(1) is equal to 3.

At the beginning 1 of the flow reception, periodic CRC calculations of type CRC(0) are started with a period of S(0) bytes in order to detect output data packets of size S(0). Two series of periodic CRC calculations of type CRC(1) are started with a period of S(1) bytes in order to detect output data packets of size S(1). As output data packets having size S(0) may be present anywhere within the flow 9 of output data packets, an other series of periodic CRC calculations of type CRC(1) with period of S(1) bytes is also started after a shift of S(0) bytes and after a shift of $2\times S(0)$ bytes, in order to detect all possible arrangements of packets having size S(0) or S(1) in the flow 9, FIG. 5 shows the method for recovering input data packets in case of a corrupted transmission; the corrupted packets are not detected and they are lost.

This method of recovering is advantageous because it provides in one and the same process a check on validity of the received data in addition to a detection of output data packets sizes.

It will however be appreciated that, providing these CRC calculations as a way of detecting the output data packet sizes in the flow 9 is one example only, and does clearly not limit the scope of the present invention. The detection of output data packet sizes may well be achieved otherwise, for instance by way of dedicated information elements inserted in the flow 9 at the emitter.

Finally, the Link Layer retrieves data segments of size s(i) from respective detected output data packets S(i), by removing the header and the trailer fields. It then delivers the retrieved data segment in order to transfer them to the upper layer SAR.

When corrupted output data packets are received, the method of recovering based on concurrent CRC calculations described above allows to retrieve all other output data packets and to limit the loss to the corrupted output data packets only.

Figure 6:
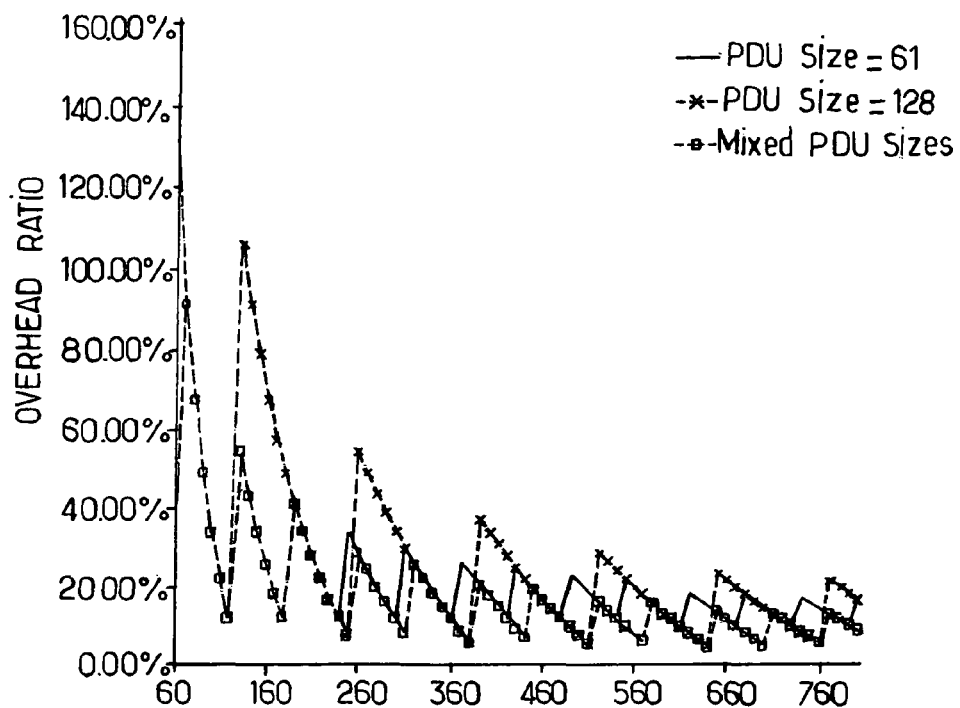
FIGS. 6 and 7 are graphs showing the overhead ratio for a different segment size values against the size of input data packets.
Figure 7:
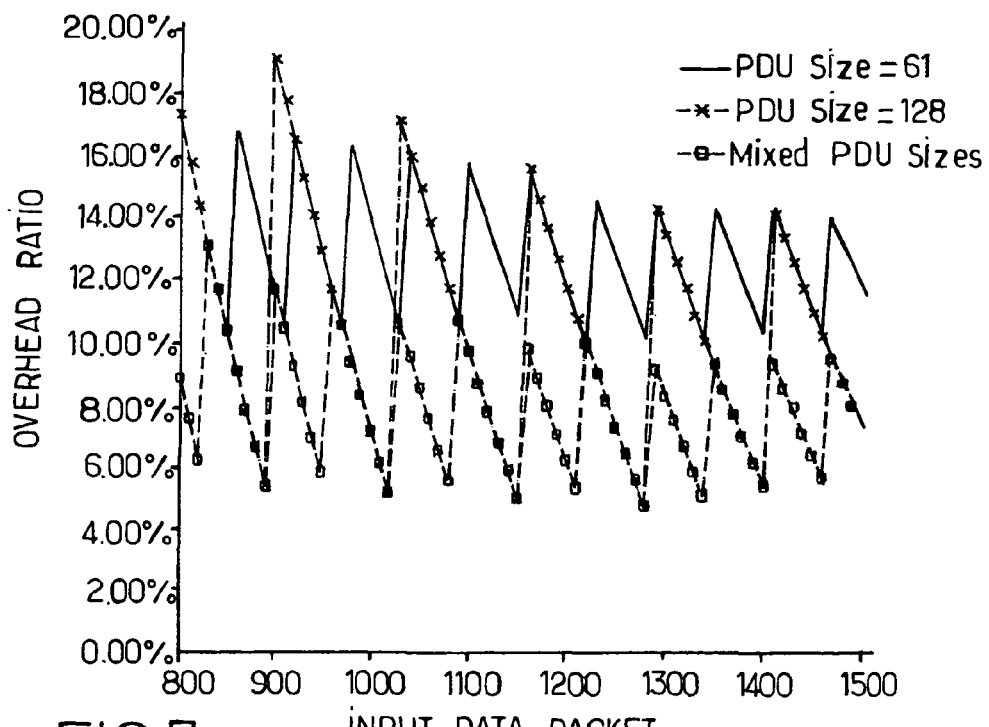

FIG. 6 and FIG. 7 illustrate the benefit of the implementation of the method of the present invention in the exemplary embodiment wherein N=2.

In this embodiment, the shortest segment size value s(0) is equal to 61 bytes, yielding to an output data packet of 67 bytes. The longest segment size value s(1) is equal to 128 bytes, yielding to an output data packet of 134 bytes.

FIG. 6 shows the overhead ratio (signaling+segment overhead) against the input data packets size through three curves. These three curves respectively correspond to three different segmentation schemes.

The first curve depicts the overhead ratio introduced by segmentation scheme with the shortest segment size value only. The second curve depicts the overhead ratio introduced by segmentation scheme with the longest segment size value only. And the third one shows the result achieved according to the present invention, wherein the segmentation scheme uses both segment size values according to the preferred embodiment described above. This segmentation scheme exhibits the best results, independently of the input data packet size.

It shall be appreciated by the one with ordinary skills in the art, that the overall overhead is decreased when provision is made of the segmentation scheme according to the present invention.

The invention claimed is:

1. A method of transferring input data packets from an upper layer of a stack of communication protocol layers to a lower layer supporting variable sized packets in a communications system, said method comprising:
  receiving, at a transmitting device, one input data packet from the upper layer;
  segmenting, at the transmitting device, said input data packet into several effective data parts to form respective data segments;
  selecting, at the transmitting device, a size of each one of said data segments from a list comprising a given number n of predetermined segment size values;
  adding, at the transmitting device, ineffective data to each one of said data segments when required to reach said selected segment size value,
  wherein the selecting of one of said segment size values from said list is performed according to a selection algorithm which minimizes overall ineffective data and/or overall signaling information and also which selects a greatest segment size value that minimizes the ineffective data in the data segment;
  adding, at the transmitting device, associated signaling information to each of said respective data segments so as to generate respective output data packets; and
  delivering, at the transmitting device, said output data packets to the lower layer.

2. A method of transferring input data packets from an upper layer of a stack of communication protocol layers to a lower layer supporting variable sized packets in a communications system, said method comprising:
  receiving, at a transmitting device, one input data packet from the upper layer;
  segmenting, at the transmitting device, said input data packet into several effective data parts to form respective data segments;
  selecting, at the transmitting device, a size of each one of said data segments from a list comprising a given number n of predetermined segment size values;
  adding, at the transmitting device, ineffective data to each one of said data segments when required to reach said selected segment size value,
  wherein the selecting of one of said segment size values from said list is performed according to a selection algorithm which minimizes overall ineffective data and/or overall signaling information;
  adding, at the transmitting device, associated signaling information to each of said respective data segments so as to generate respective output data packets; and
  delivering, at the transmitting device, said output data packets to the lower layer,
  wherein the selecting is performed according to the selection algorithm applying the following rules:
    selecting a greatest segment size value in the list which is shorter than a length of the input data packet when selecting the size of each one of said data segments except for a last data segment, and
    selecting a segment size value for the last data segment that contains the whole last effective data part and minimizes the length of the ineffective data part in said last data segment.

3. The method of any one of the claims 1 or 2, wherein the signaling information is added to the data segment in a header field and/or in a trailer field.

4. The method of claim 3, wherein the trailer field comprises a CRC, which is calculated based on at least some of the bits of the header field and on the data segment.

5. The method of claim 3, wherein a size of the signaling information is a constant value, which is independent of the segment size.

6. The method of claim 3, wherein the list of predetermined segment size values is such that after adding the signaling information, the output data packet size values are respective multiples of the smallest one of them.

7. The method of recovering input data packets received from a lower layer in a flow of output data packets generated according to claim 3, comprising:
  detecting and retrieving, at the receiving device, the size of the output data packets wherein all the values in the list of predetermined segment size values are considered;
  retrieving, at the receiving device, data segments from respective retrieved output data packets; and
  reassembling, at the receiving device, the retrieved data segments to form input data packets to be provided to the upper layer.

8. The method of claim 7, further comprising:
  detecting the beginning of the flow of packets; and
  detecting and retrieving the size of the output data packets periodically, with a period corresponding with a smallest output data packet size value.

9. The method of claim 8, wherein the signaling information includes a CRC and wherein the step of retrieving output data packets is based on CRC calculations.

10. The method of claim 9, wherein the step of retrieving output data packets, comprises:
  calculating for i=0 to i=n−1 and for j=0 to j=n(i)−1, periodic and concurrent cyclic redundancy codes CRC(i,j), wherein the respective calculation of each of said cyclic redundancy codes CRC(i,j) is performed on a given number S(i) of data words, with a respective period of S(i), and is started at an instant corresponding to a given number j×S(0) of data words after the beginning of the reception of the flow of output data packets, where i and j are positive integers, where S(i), and n(i) are strictly positive integers, where S(i) denotes the size value of one output data packet, where S(0) designates the smallest output packet data size value, and where n(i) is such that S(i)=n(i)×S(0); and retrieving output data packets based on successful CRC calculation results only.

11. A device for transferring input data packets from an upper layer of a stack of communication protocol layers to a lower layer supporting variable sized packets, comprising:

means for receiving one input data packet from the upper layer;

means for segmenting said input data packet into several effective data parts to form respective data segments;

means for selecting a size of each one of said data segments from a list comprising a given number n of predetermined segment size values;

means for adding ineffective data to each one of said data segments when required to reach said selected segment size value, wherein the selection of one of said segment size values from said list is performed according to an algorithm minimizing overall ineffective data and/or overall signaling information and also selecting a greatest segment size value that minimizes the ineffective data in the data segment;

means for adding associated signaling information to each of said data segments so as to generate respective output data packets; and means for delivering said output data packets to the lower layer.

12. The device for recovering data packets from the data packets delivered to the lower layer by the device according to claim 11, comprising:

means for detecting and retrieving data packets delivered to the lower layer, the means for detecting and retrieving including means for considering all the values in the list of predetermined segment size values;

means for retrieving data segments from respective retrieved data packets delivered to the lower layer; and means for reassembling the retrieved data segments to form input data packets to be provided to the upper layer.

13. A device for transferring input data packets from an upper layer of a stack of communication protocol layers to a lower layer supporting variable sized packets, comprising:

means for receiving one input data packet from the upper layer;

means for segmenting said input data packet into several effective data parts to form respective data segments;

means for selecting a size of each one of said data segments from a list comprising a given number n of predetermined segment size values;

means for adding ineffective data to each one of said data segments when required to reach said selected segment size value, wherein the selecting of one of said segment size values from said list is performed according to a selection algorithm which minimizes overall ineffective data and/or overall signaling information;

means for adding associated signaling information to each of said respective data segments so as to generate respective output data packets; and means for delivering said output data packets to the lower layer, wherein the selecting is performed according to the selection algorithm applying the following rules:

selecting a greatest segment size value in the list which is shorter than a length of the input data packet when selecting the size of each one of said data segments except for a last data segment, and selecting a segment size value for the last data segment that contains the whole last effective data part and minimizes the length of the ineffective data part in said last data segment.

* * * * *